United States Patent
Schneider et al.

(10) Patent No.: US 9,381,604 B2
(45) Date of Patent: Jul. 5, 2016

(54) PREFORMED BLOCK PIECE WITH THREE POINTS OF SUPPORT

(71) Applicant: Schneider GmbH & Co. KG, Steffenberg (DE)

(72) Inventors: Gunter Schneider, Marburg (DE); Helwig Buchenauer, Dutphetal-Buschenau (DE); Ulf Boerner, Marburg (DE); Klaus Kraemer, Dautphetal-Friedensdorf (DE)

(73) Assignee: Schneider GmbH & Co. KG, Steffenberg (DE)

( * ) Notice: Subject to any disclaimer, the term of this patent is extended or adjusted under 35 U.S.C. 154(b) by 370 days.

(21) Appl. No.: 13/771,842

(22) Filed: Feb. 20, 2013

(65) Prior Publication Data

US 2013/0228272 A1 Sep. 5, 2013
US 2016/0046115 A9 Feb. 18, 2016

Related U.S. Application Data

(62) Division of application No. 11/795,729, filed as application No. PCT/EP2006/064689 on Jul. 26, 2006, now abandoned.

(30) Foreign Application Priority Data

Aug. 10, 2005 (DE) .......................... 10 2005 038 063

(51) Int. Cl.
*B24B 13/005* (2006.01)
*B23Q 3/10* (2006.01)
*B24B 9/14* (2006.01)
*B32B 38/10* (2006.01)

(52) U.S. Cl.
CPC ................ *B23Q 3/105* (2013.01); *B24B 9/146* (2013.01); *B24B 13/0057* (2013.01); *B32B 38/10* (2013.01); *Y10T 156/1064* (2015.01)

(58) Field of Classification Search
CPC ................................. B23Q 3/105; B32B 38/10
USPC ........................ 156/272.2, 247, 257; 269/329
See application file for complete search history.

(56) References Cited

U.S. PATENT DOCUMENTS

| | | | |
|---|---|---|---|
| 2,573,668 A | 10/1951 | Long et al. |
| 3,794,314 A | 2/1974 | Coburn et al. |
| 3,962,833 A | 6/1976 | Johnson |
| 4,089,102 A | 5/1978 | Soper et al. |
| 4,118,898 A | 10/1978 | Godot |
| 4,158,273 A | 6/1979 | Olsen et al. |
| 4,349,374 A | 9/1982 | Rupp |

(Continued)

FOREIGN PATENT DOCUMENTS

| | | |
|---|---|---|
| DE | 37 12 148 A1 | 6/1988 |
| DE | 103 04 388 A1 | 8/2004 |

(Continued)

*Primary Examiner* — Daniel McNally
(74) *Attorney, Agent, or Firm* — David S. Safran (57) ABSTRACT

A method for placing an optical lens, with a first side and a second side, on a block piece for holding the optical lens and which has a coupling part for holding the block piece in a workpiece chuck and with a holding part for fastening the lens. The holding part has a convex or concave holding surface corresponding to a first side of the lens. The holding surface is, according to the shape of the lens to be held, provided in the form of a negative free-forming surface, and the block piece is made from a plastic that can be machined.

16 Claims, 6 Drawing Sheets

(56) References Cited

U.S. PATENT DOCUMENTS

| | | | |
|---|---|---|---|
| 4,459,784 A | 7/1984 | Hernandez et al. | |
| RE31,897 E | 5/1985 | Johnson | |
| 4,521,994 A | 6/1985 | Tusinski | |
| 4,925,518 A | 5/1990 | Wasserman et al. | |
| 4,942,696 A | 7/1990 | Winthrop et al. | |
| 5,005,633 A | 4/1991 | Mathews et al. | |
| 5,085,007 A | 2/1992 | Tusinski | |
| 5,150,547 A | 9/1992 | Johnson | |
| 5,177,907 A | 1/1993 | Rothe et al. | |
| 5,209,023 A | 5/1993 | Bizer | |
| 5,210,695 A | 5/1993 | Wood | |
| 5,380,387 A * | 1/1995 | Salamon | B29D 11/00942 156/154 |
| 5,402,607 A | 4/1995 | Lombard | |
| 5,520,568 A | 5/1996 | Craighead et al. | |
| 5,754,269 A | 5/1998 | Benjamin et al. | |
| 5,931,068 A * | 8/1999 | Council, Jr. | B23Q 3/084 82/1.11 |
| 6,074,290 A | 6/2000 | Ko et al. | |
| 6,748,831 B2 | 6/2004 | Eto | |
| 2005/0250430 A1 | 11/2005 | Volken et al. | |
| 2006/0005914 A1 | 1/2006 | Blum et al. | |
| 2006/0189255 A1 | 8/2006 | Akiyama | |
| 2006/0264159 A1 | 11/2006 | Katzman et al. | |
| 2007/0021036 A1 | 1/2007 | Kuebler et al. | |
| 2007/0105490 A1 | 5/2007 | Achy et al. | |
| 2008/0132157 A1 * | 6/2008 | Schneider et al. | 451/390 |

FOREIGN PATENT DOCUMENTS

| | | |
|---|---|---|
| EP | 0 758 571 A1 | 2/1997 |
| EP | 1 203 626 A1 | 5/2002 |
| JP | 9-47953 A | 2/1997 |
| JP | 11-198014 A | 7/1999 |
| WO | 99/60429 A1 | 11/1999 |
| WO | 00/50200 A2 | 8/2000 |
| WO | 01/53038 A1 | 7/2001 |
| WO | 03/018253 A1 | 3/2003 |
| WO | 03/018254 A2 | 3/2003 |
| WO | 2004/015482 A2 | 2/2004 |

* cited by examiner

PREFORMED BLOCK PIECE WITH THREE POINTS OF SUPPORT

CROSS REFERENCE TO RELATED APPLICATION

This application is a division of co-pending U.S. patent application Ser. No. 11/795,729.

BACKGROUND OF THE INVENTION

1. Field of the Invention

The invention relates to a block piece for the holding of an optical lens being machined with a coupling part, having an axis of rotation, for the holding and orienting in a workpiece chuck, and a holding part for the securing of the lens, wherein the holding part has a convex or concave holding surface corresponding to a first side of the lens. A holding surface is thus considered to be convex or concave if it is raised relative to the ground, i.e., bulging outward, or sunken, arching inward, regardless of whether it is configured as spherical or aspherical.

2. Description of Related Art

A method for cutting of a contact lens out of a cylindrical blank is already familiar from European Patent EP 1 112 143 B1 and corresponding U.S. Pat. Nos. 6,786,802 and 6,315,650. Here, in order to machine one base side of the blank it is fastened to a first block piece of machinable plastic material and then the machined base side is placed on a second block piece in order to fabricate the front side. The front side of the blank can be aspherical or toroidal in configuration, while the base side toward the blank is spherical in configuration.

When manufacturing aspherical spectacles glasses made from plastic, it is generally customary to bind them to the block piece by a low-melting alloy. For this, a space bounded by the block piece and the lens is filled with the alloy, so that the alloy takes on the form of the aspherical surface of the lens and binds the lens to the block piece. Using the alloy is cost-intensive and detrimental in terms of the time course of the process, since a relatively large amount of alloy is needed. The alloy has to be hot-molded, cooled down, and re-melted for purposes of removal from the block. During the cool-down process, the relative position between the block piece and the lens has to be fixed. The side of the lens being bonded in this case is spherical, in order to guarantee tightness when placed against the block piece for filling with liquid alloy. For aspherical surfaces, a sealing lip is provided between the block piece and the lens, ensuring a tight abutment.

Alternatively, Japanese Patent Application JP 11198014 A describes how to hold the lens by means of a deformable wax or how to mold this against the lens and thereby fix the lens.

SUMMARY OF THE INVENTION

The basic problem of the invention is to configure a block piece and a method for putting on and removing from the block so that an optimal putting on and taking off of the lens is assured.

The problem is solved according to the invention in that the holding surface, according to the shape of the lens being held or its side being held, is configured as an aspherical, i.e., toroidal, progressive or asymmetrical negative surface or as a negative free-forming surface, and the block piece is made of a machinable plastic. This ensures that the first side of the lens can be brought to bear against the holding surface with almost no spacing and thus the amount of adhesive to be used is reduced to a minimum. The nature of the bearing relationship between the holding surface and the first side or lens surface depends on the roughness of the surfaces, the viscosity of the adhesive used, and the bearing or pressing force employed.

Ideally, as little adhesive as possible is present between the two surfaces. The adhesive here does not constitute a spacing agent, but rather serves merely to fill up or seal off the gap or roughness present between the two surfaces. Since it is necessary, as a rule, to apply heat in conjunction with the activation of the adhesive or the application of the adhesive, a correspondingly reduced amount of heat is needed in the case of the invention for the activation or application of the extremely thin glue layer thus formed.

Furthermore, besides the aspherically configured first side of the lens, the second side of the lens for the machining can now also be aspherically, i.e., toroidally or progressively configured, so that the shapes or features which establish the optical properties of the lens, such as radii, optical axes, partial optical surfaces or prisms of the lens, can be optimally distributed over the two sides of the lens.

Moreover, the entire surface of the lens can rest against the holding surface and thus have its entire surface supported by it, and due to the machinability of the block piece any configuration of the lens is possible in terms of its diameter or width.

For purpose of holding of special spherical lenses, the holding part has a convex or concave spherical holding surface with a principal axis that describes the orientation of the partial spherical surface so formed.

According to the invention, the holding surface is configured as a negative surface to the lens, corresponding to the orientation of the lens being held, and the principal axis of the negative surface or holding surface is arranged set off from and/or tilted to the axis of rotation of the coupling part. Thus, the spherical surface of the block piece is configured individually to the orientation of the lens being held, so that the subsequent machining process can be optimally designed.

It is advantageous that the holding surface can also be configured as spherical, in addition to the above mentioned surface forms, and have several, especially three, point-like support locations for the lens being held, depending on the surface form or its orientation, and the rest of the holding surface is somewhat set back relative to the support locations. This ensures a defined bearing of the lens against the holding surface. In this variant embodiment, although somewhat more adhesive is required than when the entire surface of the lens is abutting, one can at least determine the support locations even for lenses whose first side being held is not known, while the rest of the lens surface need only be determined roughly or partially with slight precision.

It is of advantage that the remaining set-back part of the holding surface has approximately the shape of the first side of the lens being held. With regard to the previously mentioned determination of the lens surface, it is possible to reduce the accompanying process of determining or surveying the first side to a necessary degree, so that one can also use measuring means with low resolution, such as sensors or spiked gages. The spiked gauge is used for simultaneous detection of several measurement points on the surface.

Moreover, the machining chip-removal step can be reduced to a sufficient degree of complexity, so that a faster overall production of the bearing surface is assured.

For this, it is advantageous that the point-like support locations of the holding surface form part of an imaginary surface, and the imaginary surface describes the form of the first side of the lens being held. Thus, besides the defined abutment or bearing of the lens, the support locations themselves are defined. The lens can be oriented and supported or fixed exactly by the bearing surface. The free space existing between the bearing surface and the lens is limited here to a relatively small and estimable degree, so that very little adhesive is needed according to the invention. The bearing surface stands back around 0.01 mm to 0.5 mm relative to the support locations. Especially for lenses with unknown surface form of the first side being held, which have to be surveyed with the above-mentioned measuring means, the aforesaid stand-back distance is generally larger than for lenses whose geometry of held surface is known. In exceptional cases, said distance might even be greater than 0.5 mm. For the holding of unknown lenses, the setback holding surface has to be simplified, since the surface being held can only be determined with a limited resolution. This is not the case for lenses with known surface form. Here, the approximation of the holding surface serves only to speed up the fabrication of same, since the accompanying calculation expense of the machining equipment is reduced. But the support locations in this case are part of the imaginary surface, which corresponds exactly to the surface form of the first side being held.

Most lenses have at least partial spherical regions, despite their overall form being aspherical. The support locations will be situated preferably in such partial spherical regions, which are then mapped exactly on the holding surface as part of the overall imaginary surface.

An additional possibility, according to one embodiment, is that at least one channel for a pressurizing agent is provided between the holding surface and an outer surface, by which pressurizing agent from the outside can be brought into the region between the holding surface and the lens being held. For the deblocking or releasing of the lens from the block piece, it is advantageous to bring in pressurizing agents such as air, water, or fluids with other viscosities between the holding surface and the particular lens, since this deblocking step can be done very swiftly and without bringing in additional heat. The pressurizing agent channel arises at an outer surface of the block piece, so that an appropriate connection for pressurizing agent or an appropriate pressurizing agent line can be hooked up.

Also of advantage for this is that at least one equalizing channel is provided in the holding surface to receive excess adhesive. The equalizing channel can be fashioned as a groove, borehole or recess, so that when a lens is put in place the excess glue located between the lens and the holding surface is pressed into the available equalizing channel or channels. In this way, the portion of adhesive located between the lens and the holding surface can be reduced to the aforesaid minimum.

Moreover, it is advantageous that the equalizing channel and/or the pressurizing agent channel is configured in star, spiral, and/or circle shape. The number and size of the respective channels should be chosen so that the lens is also supported by its entire surface and adequately by the block piece so that the block piece does not lose the required rigidity. The equalizing channel can be provided as a circle at the outer margin of the holding surface, so that the excess adhesive emerging at the side when the lens is placed on the block is captured and does not run onto the workpiece chuck.

It is also advantageous that the pressurizing agent channel has a cross section widening in the direction of flow of the pressurizing agent. When the lens is placed on the block piece, the adhesive applied is necessarily forced into the existing pressurizing agent channels, so that it has to be forced out once again when the lens is loosened. Thanks to the aforesaid configuration of the cross section, it is easily possible to force out the at least partly hardened adhesive, since there is no undercut present.

Advantageously, several pressurizing agent channels are uniformly distributed and issue onto the holding surface, and the pressurizing agent channel has a funnel-like mouth region. The various pressurizing agent channels can be provided in place of the aforesaid equalizing channels, since these will necessarily take up excess adhesive. The distribution of the pressurizing agent channels ensures an optimal loosening and an optimal deblocking of the lens, so that it is not damaged during the release process.

In conjunction with the configuration and arrangement of the invention it is of benefit that the pressurizing agent channel emerges centrally, in the region of a center axis of the holding surface and/or in the region of the point-like support locations. The block piece is used to make the most diverse of lens forms, and very small lenses also have to be taken into consideration. With the arrangement of the pressurizing agent channel near the center of the holding surface, it is available in any case, regardless of the size of the lens being made and the cutting work involved in making the lens, on the one hand, and the size of the block piece, on the other. When the pressurized agent channel or its mouth is arranged in the region of the support locations, the deblocking process is relatively simple, since the separating of the lens from the respective relatively small support location occurs with no additional expense.

Moreover, it is advantageous for the block piece to be configured as an injection molded plastic part. This ensures a favorable and very fast production of the block piece.

Furthermore, it is advantageous that the holding surface or at least the point-like support locations of the holding surface can be activated in order to generate an adhesive force and possess adhesive properties. The block piece or at least the holding part can be formed from two kinds of plastic during the fabrication process, regardless of whether the block piece is a single or multiple part, to meet the respective requirements, i.e., those of a coupling part, on the one hand, and those of a holding part with holding surface or a support location, on the other hand. The holding part could be made, at least in the region of the holding surface or the support locations, from a plastic which develops adhesive properties after an activation by heating or melting or etching, so that the lens can be glued onto the holding surface or connected to it without applying additional adhesive or without the use of an adhesive film. In the case of heating, very slight thermal input is needed, and thus a rapid cool-down is assured.

It is advantageous that the block piece is configured at least in two parts. Thus, after fabrication of the lens, it is only necessary to dispose of the machined holding part, while the coupling part can be reused.

Moreover, it is advantageous that a double-sided adhesive film to secure the lens can be applied to the holding surface or at least in the region of its point-like support locations. Since the lens has to be protected against damage in any case by placing a film on the side being held, the use of a double-sided adhesive film which is glued first to the first side of the lens and secondly serves to attach it to the holding surface represents an optimal solution.

The problem is also solved by the method for placing an optical lens, with a first side and a second side being machined, on a block piece made of plastic, with a coupling part for a workpiece chuck and a holding part with a holding surface for the lens. Before being placed on the block, the holding surface is machined, thus generating a negative form corresponding to the first side of the lens, which has the same radii, partial surfaces, and optical axes, or an approximation thereto. An adhesive is placed on the holding surface and/or the lens and/or the holding surface is activated in order to develop an adhesive force.

The holding surface of the block piece and the first side of the lens are oriented to each other in terms of their respective position or orientation of the optical axes relative to each other, the first side and the holding surface are joined or at least brought to partly bear or rest against each other, and thus a pair of block piece and lens is formed. Preferably, the mean spacing between the holding surface and the lens is between 0.01 mm and 0.5 mm. Theoretically, the lens is supported in this case by at least three points and is statically determined on the holding surface, while for an adhesive with high viscosity and slight supporting forces there does not need to be a direct bearing of the lens. Thanks to this, the first side of the lens can be brought to bear against the holding surface with almost no spacing and thus the quantity of adhesive to be used is reduced to a minimum. Since it is generally necessary to apply heat in conjunction with the activation of glues or the applying of glues, a correspondingly reduced heat input is needed for the activation or application of the extremely thin glue layer which is formed according to the invention.

It is of advantage that the holding surface be machined in such a way as to generate several point-like support locations for the lens being held, in particular, three, and a portion of the holding surface standing somewhat back from the support locations, and the point-like support locations of the holding surface form part of an imaginary surface which describes the form of the first side of the lens being held and the setback part describes only approximately the form of the lens being held.

Finally, it is of advantage that the process steps of shaping and applying of adhesive and/or the process steps of applying adhesive and orienting be executed or worked off in reverse sequence. To the extent that the adhesive is applied to the lens, the process step of applying of adhesive can also occur prior to the step of shaping, so that only after the adhesive is applied to the lens does the machining of the block piece occur. Furthermore, it is also possible to apply the adhesive only after the orienting of the block piece and fens, especially when there needs to be as little time as possible elapsing between the applying of the adhesive and the moment of placing the lens on the holding surface, owing to the setting time of the adhesive.

For this, it is also advantageous that the adhesive is applied to the support locations in the form of a spiral, star, and/or point. When the adhesive is applied in a spiral, the centrally provided pressurizing agent channel and the other pressurizing agent channels should be kept clear so that the pressurizing agent for purposes of deblocking can expand into the open space formed by the lens and the holding surface, on the one hand, and adjoining beads of adhesive, on the other. The propagating dynamic pressure built up by the flowing pressurizing agent thus provides an ample detaching force, ensuring the deblocking of the lens or the loosening of the lens afterwards.

Finally, it is of advantage that the adhesive is hardened by using thermal radiation and/or UV radiation. Depending on the adhesive used, this hardening is possible by UV radiation or some other energy input, such as heating or the like.

Moreover, it is advantageous that the adhesive is configured as a double-sided adhesive film and it is brought to bear against the holding surface and the lens.

Since the lens has to be protected against damage in any case by placing a film on the side being held, the use of a double-sided adhesive film which is glued first to the first side of the lens and secondly serves to attach it to the holding surface represents an optimal solution.

Furthermore, it is advantageous that at least one equalizing channel is worked into the holding surface before or after the machining of the holding surface, to receive excess adhesive, and/or at least one recess fashioned as a pressurizing agent channel is worked into the block piece before or after the machining of the holding surface, ensuring communication between the holding surface and the surroundings. Depending on the desired lens form, an individual configuring of the equalizing and pressurizing agent channels may be required and advantageous to the invention. The connection of different channels is also possible, emerging at different points on the holding surface.

Finally, it is of advantage that the hardening of the adhesive in terms of duration and/or intensity occurs in such a way that the adhesive is basically only hardened completely in the region between the lens and the holding surface and it is not hardened in the region of the equalizing channel and/or the pressurizing agent channel. Thus, when deblocking or releasing the lens, the inflowing pressurizing agent is not prevented from entering between the lens and the holding surface, so that a simpler and more controlled detaching of the lens is assured in view of the nonexistent glue forces inside the channels.

It is also advantageous for this that the machining and/or polishing of the second side of the lens occur after connecting the lens to the block piece. The lens placed on the block according to the invention can now be machined in any manner, and the particular pair of block piece and lens remains as a unit for all further processing steps after the fabrication, until the lens is finally ready.

Moreover, it is advantageous that the pair of block piece and lens is clamped in an additional workpiece chuck for the polishing of the lens. The block piece of the invention or the pair formed by the block piece and lens according to the invention can be used in all workpiece chucks or block piece holders required for the processing at stations further downstream.

Moreover, it is advantageous that the coating of the lens on the block occurs after the machining and/or polishing of the lens and that at least one pair of block piece and lens is placed in an additional block piece holder for the coating of the lens. As a rule, several lenses will be coated at the same time, and these or the pairs of block piece and lens will be arranged one next to the other in the area of a vapor deposition or coating source. It is very important that only the first side being machined and the marginal zone of the lens be coated. Since, according to the invention, the second side not being machined is covered for its entire surface by the block piece, it remains inevitably free of unwanted coating agent. The block piece of the invention remains with the lens, as part of the pair of block piece and lens, and it can be received by the block piece holder for purposes of coating.

Finally, it is advantageous to machine or polish the marginal zone R of the pair of block piece and lens after the coating of the lens. It is desirable, after the coating of the lens, to finish the marginal zone of the now coated lens, where coating errors may occur due to contour working and surface stresses. According to the invention, this processing step of adjusting the lens size and the machining of the marginal zone for mounting in a spectacles frame comes after the coating. Thanks to the machinable and grindable block piece, which remains on the lens according to the invention, this can be accomplished with no further reblocking expense, regardless of its size and the shape of the marginal zone. The block piece of the invention also ensures a free machining of the lens without hindrance from otherwise present clamping or chucking devices. Even borings and the like can be easily done.

Moreover, it is advantageous that pressurizing agent for deblocking the lens is introduced via the pressurized agent channel between the first side of the lens and the holding surface of the block piece or at least the point-like support locations of the holding surface. Depending on the configuration of the bonding agent in terms of the form when applying the bonding agent or adhesive, the pressurizing agent propagates into the above described, not sealed free space or gap between lens, holding surface, and beads of adhesive, so that the detaching of the lens is gradually achieved. But, even when adhesive is applied over the entire surface, i.e., when there are no unsealed places between the holding surface and the lens, as in the case of adhesive film or other glue variants, such as melting on the holding surface, the steady propagation of the pressurizing agent from the mouth of the pressurizing agent channel or the various mouths is assured.

Furthermore, it is advantageous that the adhesive and/or the lens is heated or cooled for the deblocking and/or loosening of the lens. Since thanks to the invention it is possible to use very little adhesive or bonding agent, the process of detachment by heating or cooling the adhesive is very fast, as only a little adhesive is present. In the case of cooling, the adhesive becomes brittle.

It is advantageous according to the invention that, for the deblocking and/or loosening of the lens, the remaining holding part and/or the coupling part of the block piece is deformed so that the holding surface is deformed and at least partly loosened from the lens. For this, the remaining holding part and/or the coupling part is taken up in a collet chuck acting in the radial direction, generating an appropriate clamping force, so that the remaining holding part and/or the coupling part is upset. As a result of this upsetting, the remaining holding part arches up and the lens is detached from the holding surface or bonding agent. The fact that the glue layer is very thin, according to the invention, also favors the deblocking operation.

Alternatively, it is beneficial that the holding part and/or the coupling part of the block piece is provided with at least one slot or slotted prior to the deforming, and only then deformed. For this, the pair of block piece and lens must be removed from the workpiece chuck and possibly be held at the lens side, so that the coupling part can be slotted by means of a saw or a milling cutter.

It is of advantage here that the holding part and/or the coupling part be subjected to a clamping force in a direction transverse to the slot for purposes of deformation. The slot will be deep enough so that the slot at least partly closes during the subsequent deformation process by clamping or compressing at least the coupling part, and the holding part also becomes deformed, so that it is loosened from at least part of the lens. Preferably, the slot will extend until just before the glass, i.e., just into the holding part, so that a remaining wall thickness of around 1 mm to 2 mm remains for the block piece. During the clamping, the loosening process is initiated at the margin and then continues toward the middle, thanks to the lasting deformation.

Other benefits and details of the invention are explained below with reference to the accompanying drawings.

DETAILED DESCRIPTION OF THE INVENTION

Figure 1:
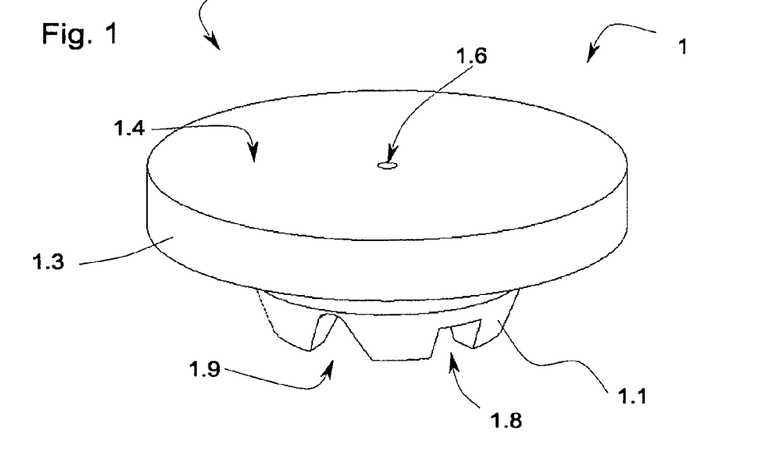
FIGS. 1 to 12 show a perspective representation of the block piece and the lens during the various machining processes.
Figure 2:
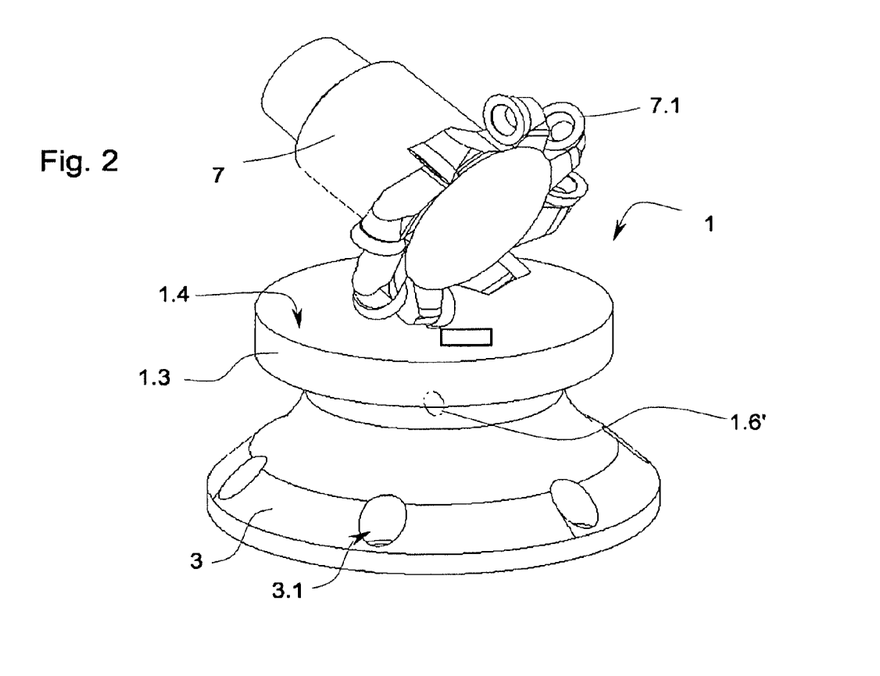
Figure 4:
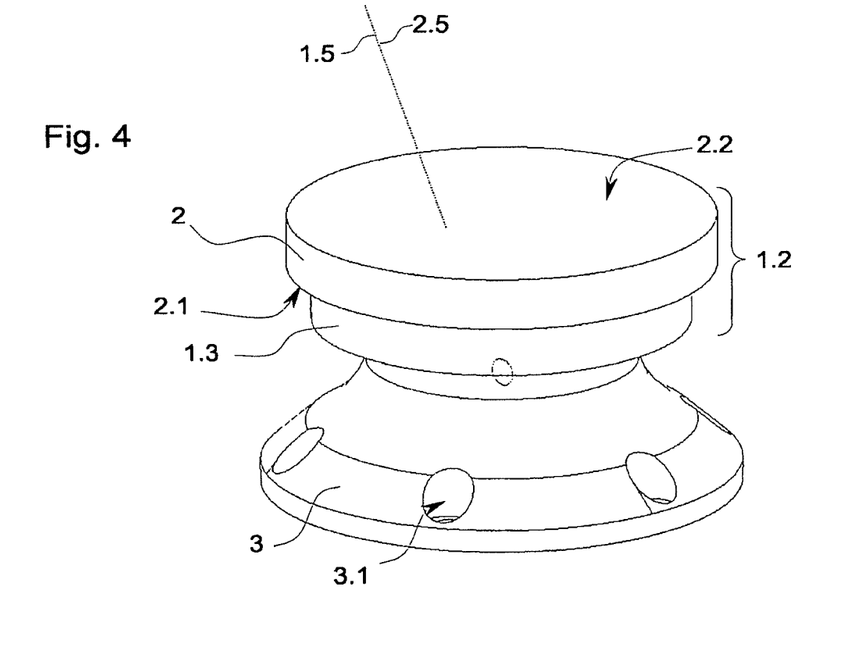

A block piece 1 shown in FIG. 1 has a coupling part 1.1 for holding and orienting in a workpiece chuck 3 or block piece chuck per FIG. 2, as well as a holding part 1.3 with a holding surface 1.4 for a lens 2 configured as a spectacles glass per FIG. 4. The holding part 1.3 has so large a diameter that every spectacles glass being fabricated can be brought to bear against the holding surface 1.4 with the entire surface of a second side 2.2. At the center of the holding surface 1.4, the block piece 1 has the mouth of a pressurizing agent channel 1.6, by which pressurizing agent can be taken from an outer surface 1.7 into the region of the holding surface 1.4. The workpiece chuck 3 per FIG. 2 has several recesses 3.1 for detent screws, distributed about the circumference, in order to attach the flange of a tool spindle, not shown.

The coupling part 1.1 has, besides a conical or cylindrical support surface of a particular diameter, also a bearing surface at its end, working in the axial direction, and it has two grooves which can be mounted by form-fitting in the workpiece chuck 3, one a driving groove 1.9 for the rotary propulsion of the block piece 1 and one an orienting groove 1.8, serving to line up the block piece 1 relative to the workpiece chuck 3.

According to FIG. 2, the block piece 1 or the holding surface 1.4 of the block piece 1 is machined by means of a milling head 7 with several blades 7.1. The holding surface 1.4 in this process is given the negative form corresponding to the second side 2.2 of the spectacles glass 2 being fastened. FIG. 2 shows, moreover, a connection opening 1.6' of the pressurized agent channel 1.6, which is situated on the outside of the block piece 1.

Figure 3:
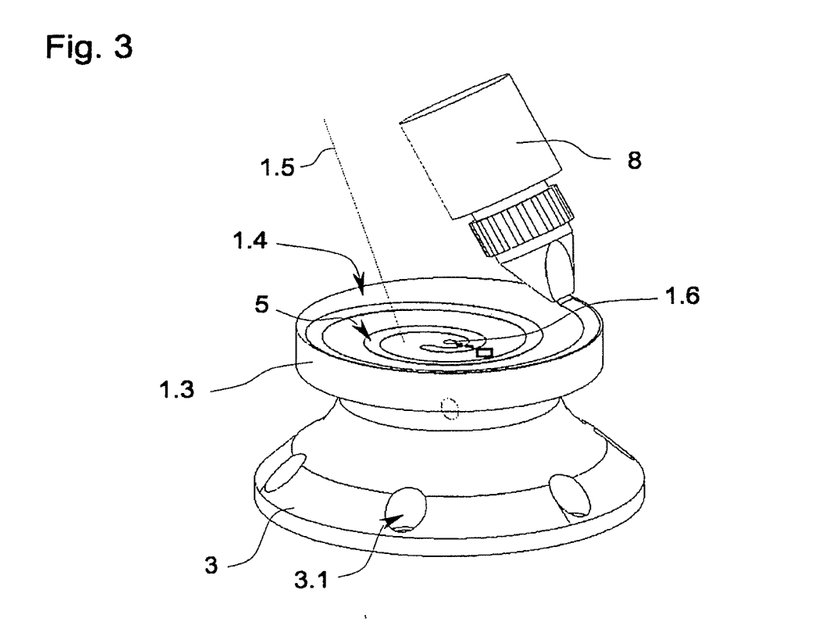

The holding surface 1.4 shown in FIG. 3 now represents the negative form to a first side 2.1 of the spectacles glass 2 per FIG. 4. Adhesive or bonding agent 5 in the form of a bead is applied in spiral manner to the holding surface 1.4 by a spray nozzle or adhesive nozzle 8. Thus, the mouth of the centrally placed pressurized agent channel 1.6 remains free of adhesive. The holding surface 1.4 thus prepared likewise has an imaginary optical axis 1.5, as negative surface, just like the first side 2.1 of the lens 2 being supported per FIG. 4.

It is advantageous that the holding surface 1.4 be configured as spherical, and in addition to the above mentioned surface forms, have several, especially three, point-like support locations for the lens being held, depending on the surface form or its orientation, and the rest of the holding surface is somewhat set back relative to the support locations. This ensures a defined bearing of the lens against the holding surface. In this variant embodiment, although somewhat more adhesive is required than when the entire surface of the lens is abutting, one can at least determine the support locations even for lenses whose first side being held is not known, while the rest of the lens surface need only be determined roughly or partially with slight precision. Preferably, the point-like support is made to provide mean spacing between the holding surface and the lens of between 0.01 mm and 0.5 mm.

According to FIG. 4, the spectacles glass 2 is placed or glued by its first side 2.1 against the holding surface 1.4 of the holding part 1.3. The rough blank of the spectacles glass 2 shown here is larger in terms of diameter than the holding part 1.3. But this is not detrimental, since the spectacles glass 2 being fabricated is clearly smaller than the rough blank, so that it ultimately lies, as described above, with its entire surface on the holding part 1.3. The blank or the lens 2, together with the block piece 1, form a so-called block piece/lens pair 1.2, which constantly remains a single unit in the following processing steps.

Figure 5:
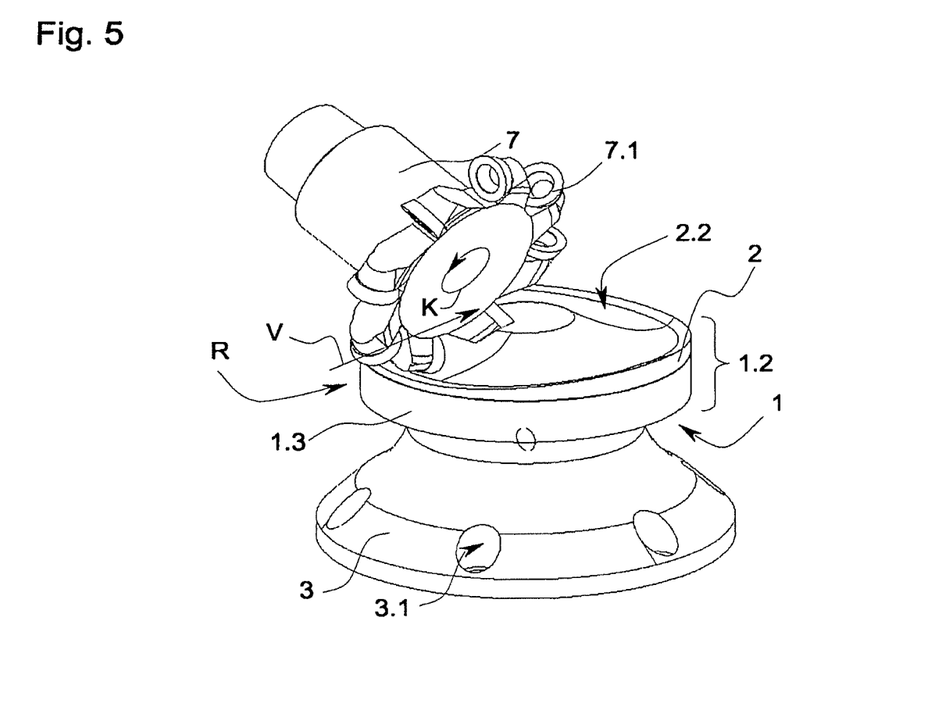

According to FIG. 5, the second side 2.2 of the lens 2 is machined by means of the milling head 7 with several blades 7.1. The machining is done in the direction of rotation K of the milling head 7 and also in a feed direction V, from the outside inward. Hence, given the superimposed rotary motions of milling head 7 and lens 2 or workpiece spindle, a better cutting chip is produced and there is a better supporting of the lens 2, since the cutting forces act to the side and upward. Thus, the chip is detached upward at the not yet fully machined surface. Such surface flaws are worked off again in the subsequent machining. In the milling work per FIG. 5, besides the second side 2.2 of the lens 2, a marginal zone R of the lens and of the holding part 1.3 is also machined.

Figure 6:
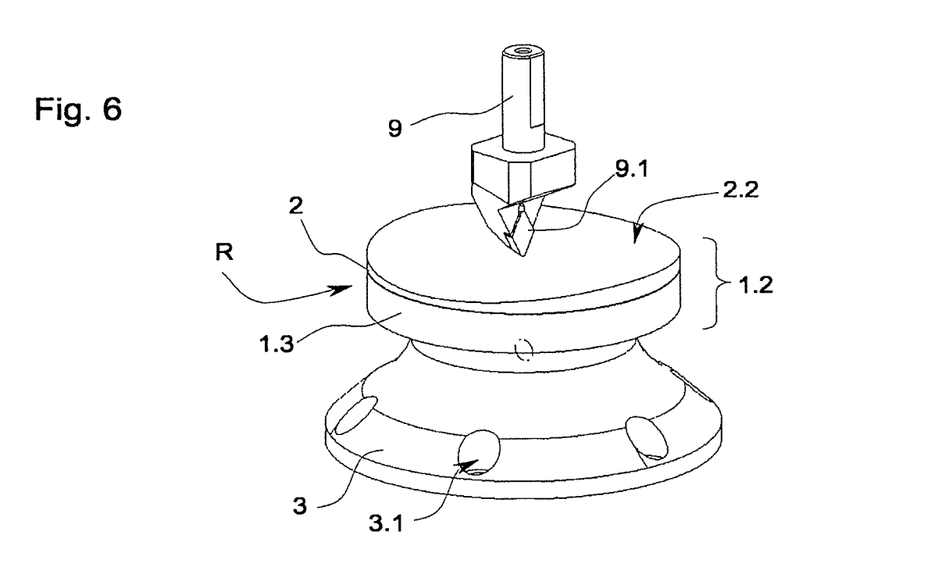

In FIG. 6, after the milling work, it is now primarily the second side 2.2 of the lens 2 that is machined with a turning chisel 9 or cutting insert 9.1 of the turning chisel 9.

Figure 7:
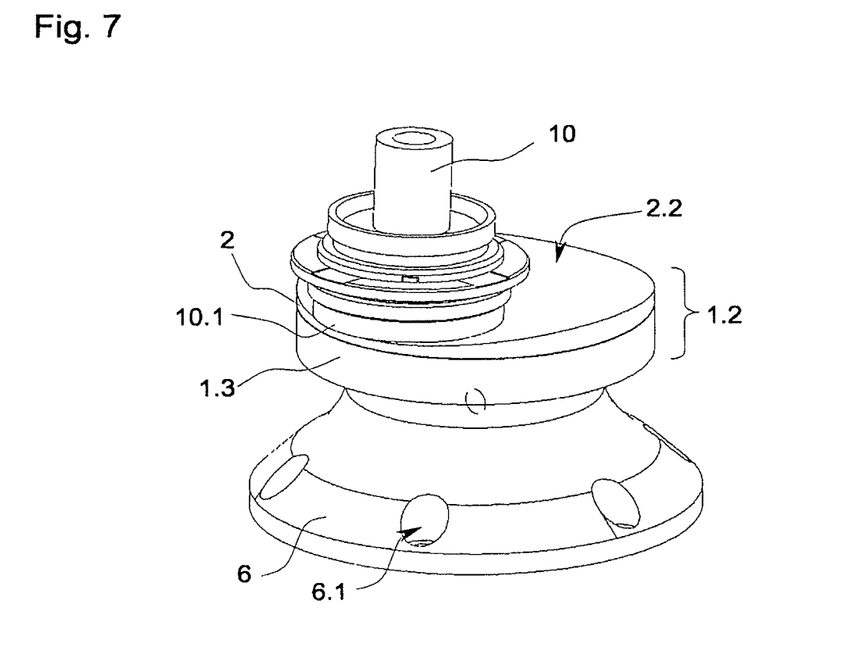

In FIG. 7, the second side 2.2 of the lens 2 is polished over its entire surface by a polishing head 10 with a polishing shoe 10.1, the entire surface being supported by the holding part 1.3.

Figure 8:
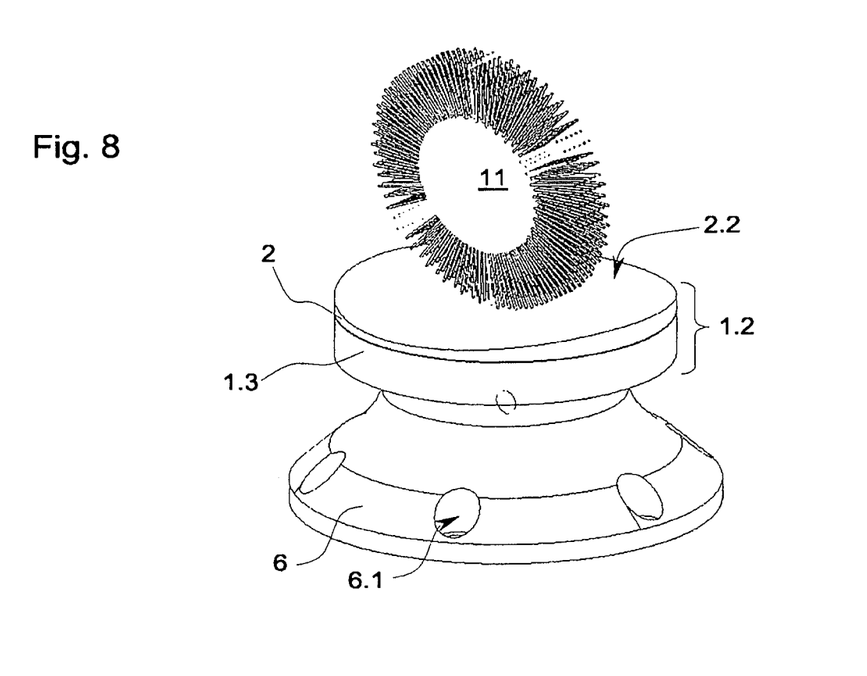

After this, the lens 2 or the second side 2.2 per FIG. 8 is cleaned with a cleaning brush 11, and an ultrasound cleaning is also possible as a supplement or an alternative. In all processing steps thus far, the block piece/lens pair has remained a single unit. Both during the polishing and during the cleaning, the block piece 1 or the coupling part 1.1 of the block piece 1 is taken up in another workpiece chuck 6 with recesses 6.1 for detent screws. The workpiece chuck 6 can also be secured in a different way.

Figure 9:
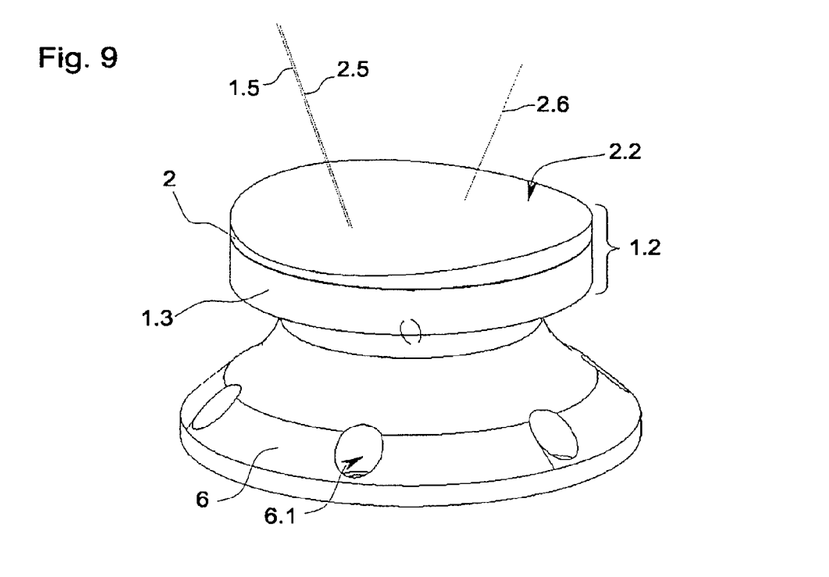

According to FIG. 9, the first side 2.1 of the lens 2 is now ready. It has a second optical axis 2.6, differing from an optical axis 2.5 of the second side 2.2. Thus, the features of the lens 2 assuring the optical properties of the spectacles glass are apportioned between the first side 2.1 and the second side 2.2 of the lens 2, corresponding to the optical axes 2.5, 2.6.

Figure 10:
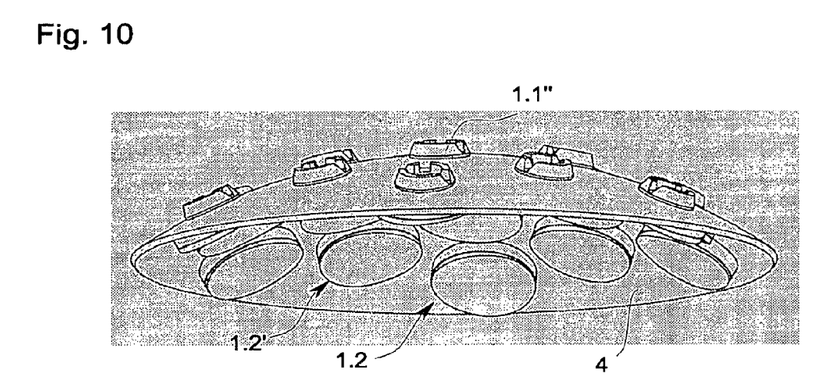

For a coating of the second side 2.2 of the lens 2, this along with the block piece, i.e., the respective block piece/lens pairs 1.2, 1.2', is placed in or taken up by a bell-shaped block piece holder 4 per FIG. 10. The block pieces 1 are normalized to the extent that they fit into the various workpiece chucks 3, 6 and block piece holders according to the preceding machining processes. The first side 2.1 of the lens 2 is placed or protected with its entire surface against the holding surface 1.4 of the holding part 1.3 so that only the second side 2.2 of the lens 2 and the marginal zone R are coated during this coating process.

Since flaws may occur during the coating, especially in the marginal zone of the lens 2, the marginal zone R is machined only after the coating to produce the final shape.

Figure 11:
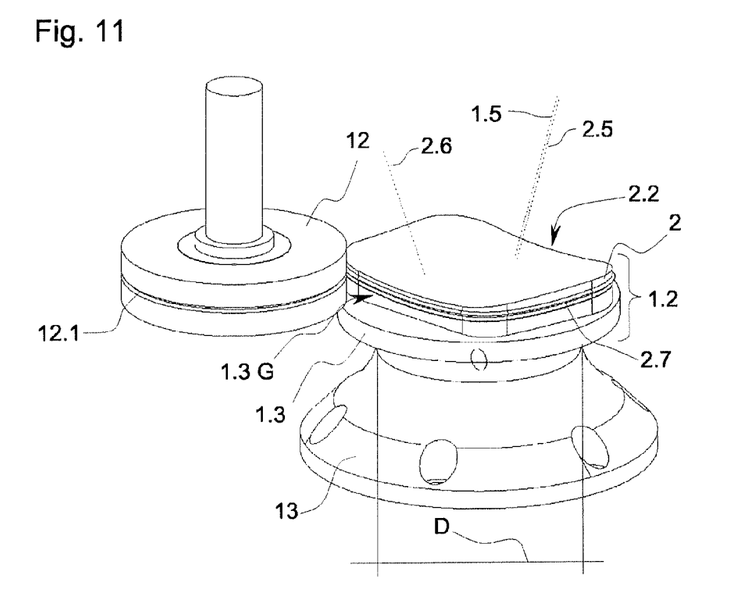

According to FIG. 11, a grinding disk 12 or milling cutter is used to grind down the marginal zone R or the circumference of the spectacles glass 2 to the desired dimension, which dimension will depend on a diameter $^D$ of the coupling part 1.1 of the block piece 1. Only the marginal zone R of the spectacles glass 2 and a partial marginal zone of a holding part 1.3G is machined or ground. The grinding disk 12, furthermore, has a peripheral groove 12.1, so that the grinding process leaves behind a corresponding margin 2.7 on the spectacles glass 2 for fastening in a frame. The coupling part 1.1 of the block piece 1 is taken up in another workpiece chuck 13 with recesses 13.1 for detent screws.

Figure 12:
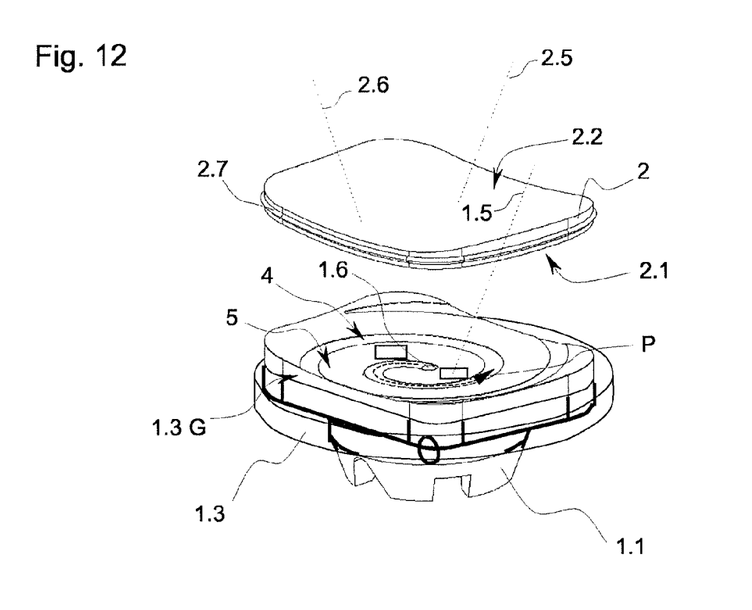

According to FIG. 12, the spectacles glass 2 has been deblocked from the holding part 1.3. For this, pressurizing agent (not shown) was introduced via the pressurizing agent channel 1.6 between the holding surface 1.4 and the first side 2.1 of the lens 2. In view of the bead 3 of adhesive present on the holding surface 1.4, the pressurizing agent introduced propagated into the free space formed between holding surface 1.4 and first side 2.1, on the one hand, and the adjacent beads 5, on the other (see the direction of flow P), thus initiating the process of detachment of the spectacles glass 2.

What is claimed is:

1. A method for placing an optical lens, with a first side and a second side on a block piece made of plastic that has a coupling part for a workpiece chuck and a holding part with a holding surface for the lens, comprising the steps of:
    a) placing an adhesive on the holding surface and/or the lens,
    b) orienting the holding surface of the block piece and the first side of the lens relative to each other in terms of their respective axial position,
    c) joining the first side and the holding surface and thus forming a pair of block piece and lens, and
    d) before being placed on the block piece, machining the holding surface, thus generating a negative form corresponding to the first side of the lens.

2. The method according to claim 1, wherein the holding surface is machined in such a way as to generate several point-like support locations for the lens being held, wherein a portion of the holding surface stands somewhat back from the support locations, and the point-like support locations of the holding surface form part of an imaginary surface which describes the form of the first side of the lens being held and the setback part describes only approximately the form of the lens being held.

3. The method according to claim 2, wherein the adhesive is applied to the support locations in the form of a spiral, star, or point or a combination thereof.

4. The method according to claim 2, wherein pressurizing agent for deblocking the lens is introduced via a pressurized agent channel between the first side of the lens and at least the pointlike support locations of the holding surface of the block piece.

5. The method according to claim 2, wherein the point-like support is made to provide mean spacing between the holding surface and the lens of between 0.01 mm and 0.5 mm.

6. The method according to claim 1, further including the steps of machining or polishing or a combination thereof of the second side of the lens occurs after connecting the lens to the block piece.

7. The method according to claim 6, further including the steps of coating the lens on the block occurs after the machining or polishing of the lens or a combination thereof.

8. The method according to claim 7, further including the steps of machining or polishing a marginal zone of the pair of block piece and lens after the coating of the lens.

9. The method according to claim 7, wherein at least one pair of block piece and lens is placed in an additional block piece holder for the coating of the lens.

10. The method according to claim 1, further including the steps of hardening the adhesive by using thermal radiation or UV radiation or a combination thereof.

11. The method according to claim 10, wherein the hardening of the adhesive in terms of duration and/or intensity occurs in such a way that the adhesive is basically only hardened completely in the region between the lens and the holding surface and it is not hardened in the region of an equalizing channel and/or a pressurizing agent channel.

12. The method according to claim 1, wherein the adhesive is configured as a double-sided adhesive film and it is brought to bear against the holding surface and the lens.

13. The method according to claim 1, further including the steps of working at least one equalizing channel into the holding surface before or after the machining of the holding surface per step d), to receive excess adhesive.

14. The method according to claim 1, wherein at least one recess fashioned as a pressurizing agent channel is worked into the block piece before or after the machining of the holding surface per step d), ensuring communication between the holding surface and the surroundings.

15. The method according to claim 1, wherein the pair of block piece and lens is clamped in an additional workpiece chuck for polishing of the lens.

16. The method according to claim 1, wherein the adhesive and/or the lens is heated or cooled for deblocking or loosening of the lens.

* * * * *